United States Patent
Tsai et al.

(10) Patent No.: US 9,678,348 B2
(45) Date of Patent: Jun. 13, 2017

(54) OPTICAL MODULE AND HEAD MOUNTED DISPLAY

(71) Applicant: Coretronic Corporation, Hsin-Chu (TW)

(72) Inventors: Chih-Hsien Tsai, Hsin-Chu (TW); Haw-Woei Pan, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 0 days.

(21) Appl. No.: 15/185,044

(22) Filed: Jun. 17, 2016

(65) Prior Publication Data

US 2017/0090197 A1 Mar. 30, 2017

(30) Foreign Application Priority Data

Sep. 30, 2015 (TW) .............................. 104132142 A

(51) Int. Cl.
*G02B 27/14* (2006.01)
*G09G 5/00* (2006.01)
*G02B 27/01* (2006.01)
*F21V 8/00* (2006.01)

(52) U.S. Cl.
CPC ....... *G02B 27/0172* (2013.01); *G02B 6/0035* (2013.01); *G02B 2027/012* (2013.01); *G02B 2027/0125* (2013.01)

(58) Field of Classification Search
CPC .............. G02B 27/0172; G02B 6/0035; G02B 2027/012; G02B 2027/0125; G02B 27/01; G02B 27/0101; G02B 27/017
USPC ........................... 359/629, 630, 633; 345/7–9
See application file for complete search history.

(56) References Cited

U.S. PATENT DOCUMENTS

| 7,577,326 | B2 | 8/2009 | Amitai |
| 2004/0070820 | A1* | 4/2004 | Nishimura ........... B23K 26/067 359/359 |
| 2011/0175799 | A1 | 7/2011 | Yamada et al. |
| 2015/0226971 | A1 | 8/2015 | Kim et al. |

FOREIGN PATENT DOCUMENTS

CN 104216042 12/2014

* cited by examiner

*Primary Examiner* — William Choi
(74) *Attorney, Agent, or Firm* — Jianq Chyun IP Office

(57) ABSTRACT

An optical module includes an optical waveguide, at least one beam splitter and a light source. The optical waveguide has a first surface, a second surface and a light incidence surface. An interior angle between the light incidence surface and the first surface is θ. A distance between the first and the second surfaces is T. A refractive index of the optical waveguide is n. Each beam splitter and the first surface have a first intersection point on a reference plane perpendicular to the first surface, and the light incidence surface and the second surface have a second intersection point having a first orthogonal projection on the first surface. A distance between the first orthogonal projection and the first intersection point closest to the light incidence surface is H. An incidence angle of a beam at the light incidence surface is a, and $$a \leq \sin^{-1}\left\{n \times \sin^{-1}\left[90° - \theta - \tan^{-1}\left(\frac{H}{T}\right)\right]\right\}.$$

10 Claims, 6 Drawing Sheets

OPTICAL MODULE AND HEAD MOUNTED DISPLAY

CROSS-REFERENCE TO RELATED APPLICATION

This application claims the priority benefit of Taiwan application serial no. 104132142, filed on Sep. 30, 2015. The entirety of the above-mentioned patent application is hereby incorporated by reference herein and made a part of this specification.

BACKGROUND

Field of the Invention

The invention is directed to an optical module and a head mounted display and more particularly, to an optical module and a head mounted display having an optical waveguide.

Description of Related Art

With the progress of display technologies and people's desire for high-tech, technologies with respect to virtual reality and augmented reality have become more and more mature. Among them, a head mounted display (HMD) that can achieve the technologies has drawn more and more attention in the display field.

FIG. 1A is a schematic diagram illustrating a head mounted display of the related art. FIG. 1B is a schematic enlarged diagram of a region AA depicted in FIG. 1A. Referring to FIG. 1A & FIG. 1B, a head mounted display 10 includes an optical waveguide 12, a plurality of beam splitters 14, a reflector 16 and a display device 18. The beam splitters 14 and the reflector 16 are disposed in the optical waveguide 12. The reflector 16 is adapted to transmit an image beam IB from the display device 18 to the beam splitters 14, and the beam splitters 14 are adapted to transmit the image beam IB to a user's eyes E. When the image beam IB is transmitted within the optical waveguide 12, a part of the image beam IB (e.g., an image beam IBB) generates stray light IB2 in angle symmetry to normal outgoing light IB1 due to a travelling path change, which leads the user to view not only a normal image, but also a ghost image in symmetry to the normal image. Referring to FIG. 1B, the partial image beam IBB incident to the reflector 16 deviates from the normal travelling path of the image beam IBA due to a second reflection occurring to the reflector 16 (at a position of the second reflection marked by circle in FIG. 1B), which results in the stray light IB2 being formed subsequently and causes adverse affection to display quality. Therefore, how to reduce a ratio of the stray light has become one of the major subjects for the technology development in the art.

The information disclosed in this "Description of Related Art" section is only for enhancement of understanding of the background of the described technology and therefore it may contain information that does not form the prior art that is already known to a person of ordinary skill in the art. Further, the information disclosed in this "Description of Related Art" section does not mean that one or more problems to be resolved by one or more embodiments of the invention were acknowledged by a person of ordinary skill in the art.

SUMMARY

According to an embodiment of the invention, an optical module capable of effectively reducing a ratio of stray light generated inside an optical waveguide is provided.

According to an embodiment of the invention, a head mounted display having good display quality is provided.

Additional aspects and advantages of the invention will be set forth in the description of the techniques disclosed in the invention.

In order to achieve at least one of the objects or other objects, an embodiment of the invention provides an optical module, including an optical waveguide, at least one beam splitter and a light source. The optical waveguide has a first surface, a second surface and a light incidence surface. The first surface and the second surface are parallel to each other. The light incidence surface is connected with the first surface and the second surface. An interior angle between the light incidence surface and the first surface is θ, a distance between the first surface and the second surface is T, and a refractive index of the optical waveguide is n. The at least one beam splitter is disposed in the optical waveguide, each beam splitter is connected with the first surface and the second surface, each beam splitter and the first surface have a first intersection point on a reference plane perpendicular to the first surface, and the light incidence surface and the second surface have a second intersection point on the reference plane. The second intersection point has a first orthogonal projection on the first surface. A distance between the first orthogonal projection and the first intersection point closest to the light incidence surface is H. The light source is disposed next to the light incidence surface and adapted to provide a beam. The beam enters the optical waveguide through the light incidence surface. An incidence angle of the beam at the light incidence surface is a, which conforms to $$a \leq \sin^{-1}\left\{n \times \sin^{-1}\left[90° - \theta - \tan^{-1}\left(\frac{H}{T}\right)\right]\right\}.$$

In order to achieve at least one of the objects or other objects, an embodiment of the invention provides a head mounted display, including an optical waveguide, at least one beam splitter and a display device. The optical waveguide has a first surface, a second surface and a light incidence surface. The first surface and the second surface are parallel to each other. The light incidence surface is connected with the first surface and the second surface. An interior angle between the light incidence surface and the first surface is θ, a distance between the first surface and the second surface is T, and a refractive index of the optical waveguide is n. The beam splitter is disposed in the optical waveguide, and each beam splitter is connected with the first surface and the second surface. Each beam splitter and the first surface have a first intersection point on a reference plane perpendicular to the first surface, and the light incidence surface and the second surface have a second intersection point on the reference plane. The second intersection point has a first orthogonal projection on the first surface, and a distance between the first orthogonal projection and the first intersection point closest to the light incidence surface is H The display device is disposed next to the light incidence surface and adapted to provide an image beam. The image beam enters the optical waveguide through the light incidence surface, an incidence angle of the beam at the light incidence surface is a, which conforms to $$a \leq \sin^{-1}\left\{n \times \sin^{-1}\left[90° - \theta - \tan^{-1}\left(\frac{H}{T}\right)\right]\right\}.$$

Based on the above, the embodiments of the invention achieve at least one of the following advantages and effects. In the optical module and the head mounted display of the invention, the optical waveguide has the light incidence surface which the beam or the image beam can transmit through and is inclined relative to the first surface and the second surface. The beam or the image beam after entering the optical waveguide through the light incidence surface is transmitted toward the beam splitter. Thus, in the optical module and the head mounted display of the invention, it is unnecessary to dispose a reflector used for guiding the beam or the image beam to the beam splitter in the optical waveguide. With this design, a travelling path change due to the beam or the image beam irradiated to an end portion of the reflector can be avoided, so as to contribute to reducing the stray light generated inside the optical waveguide. In addition, through the design of $$a \leq \sin^{-1}\left\{n \times \sin^{-1}\left[90° - \theta - \tan^{-1}\left(\frac{H}{T}\right)\right]\right\},$$

it can be ensured that the beam or the image beam entering the optical waveguide is transmitted to the beam splitter closest to the light incidence surface (which is referred to as a first beam splitter) through at least one total reflection, so as to avoid the stray light from being generated due to the beam or the image beam being directly irradiated to the first beam splitter without any total reflection. Thus, the optical module of the invention can effectively reduce the ratio of the stray light generated inside the optical waveguide, and the head mounted display can have good display quality.

Other objectives, features and advantages of the invention will be further understood from the further technological features disclosed by the embodiments of the invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the invention may be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1A:
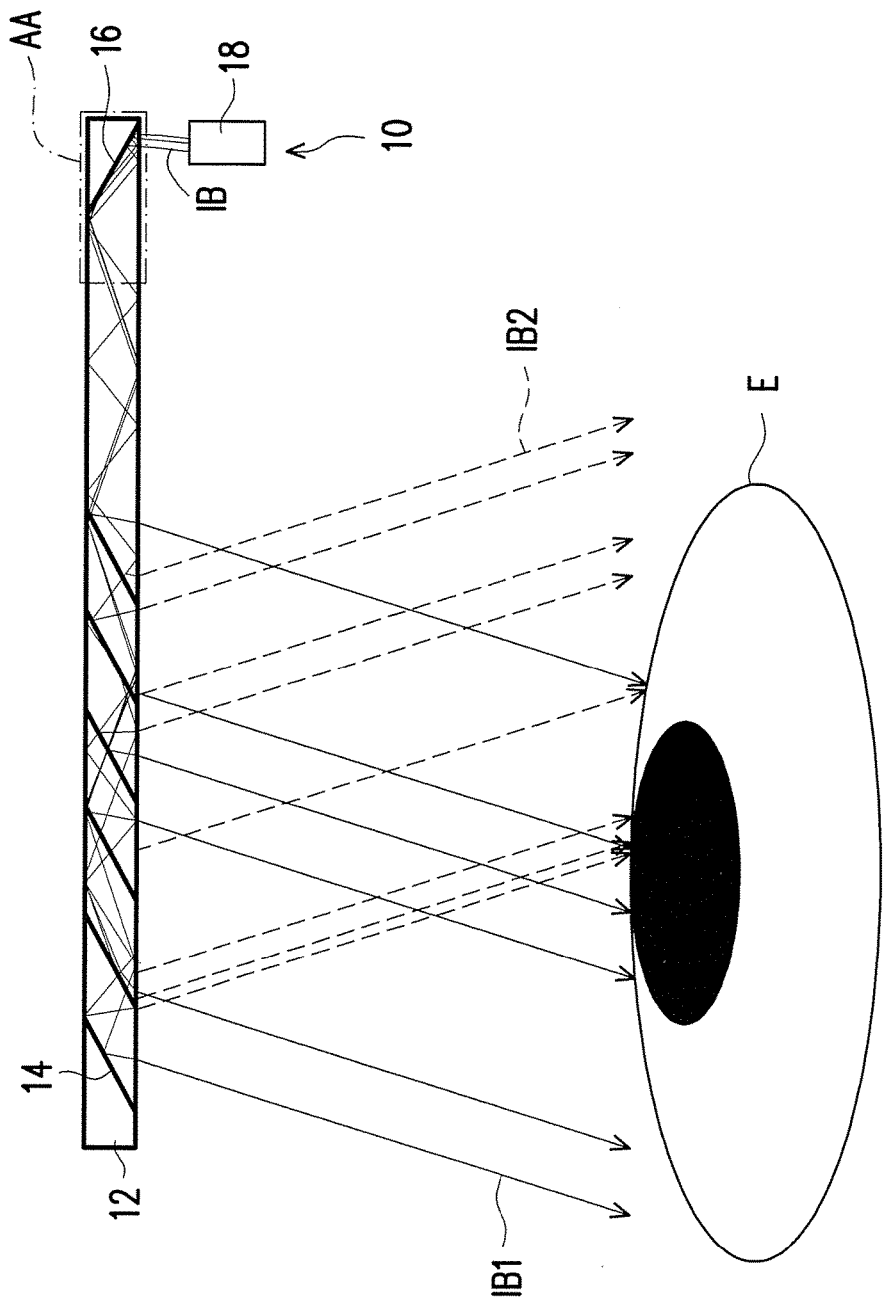
FIG. 1A is a schematic diagram illustrating a head mounted display of the related art.
Figure 1B:
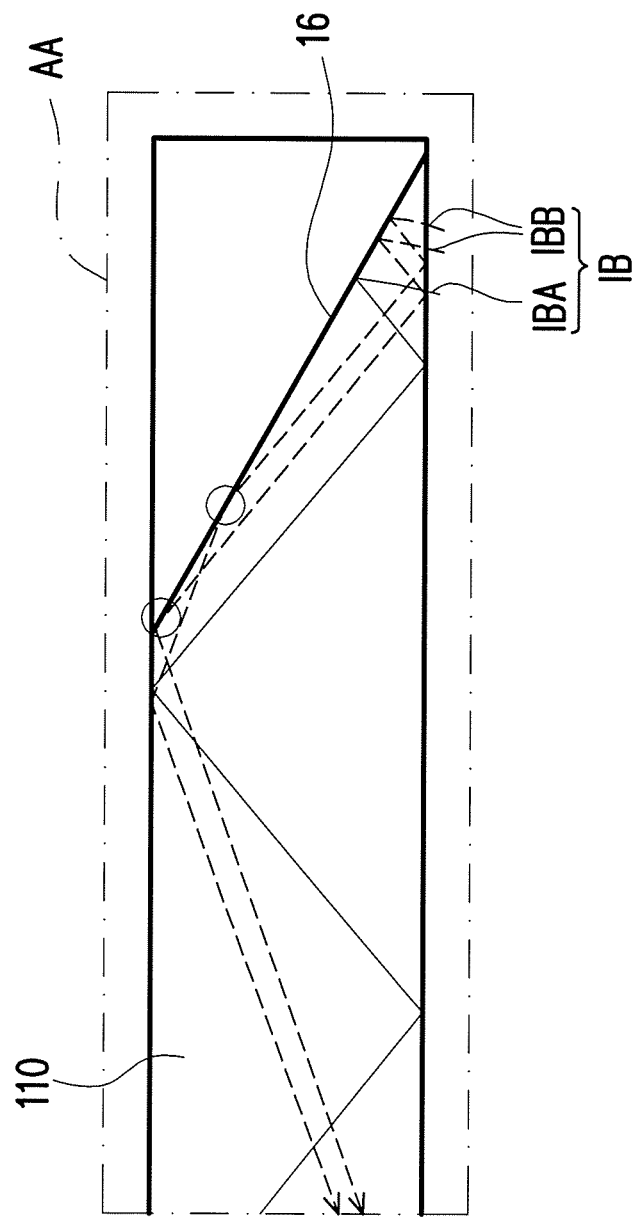
FIG. 1B is a schematic enlarged diagram of a region AA depicted in FIG. 1A.
Figure 2:
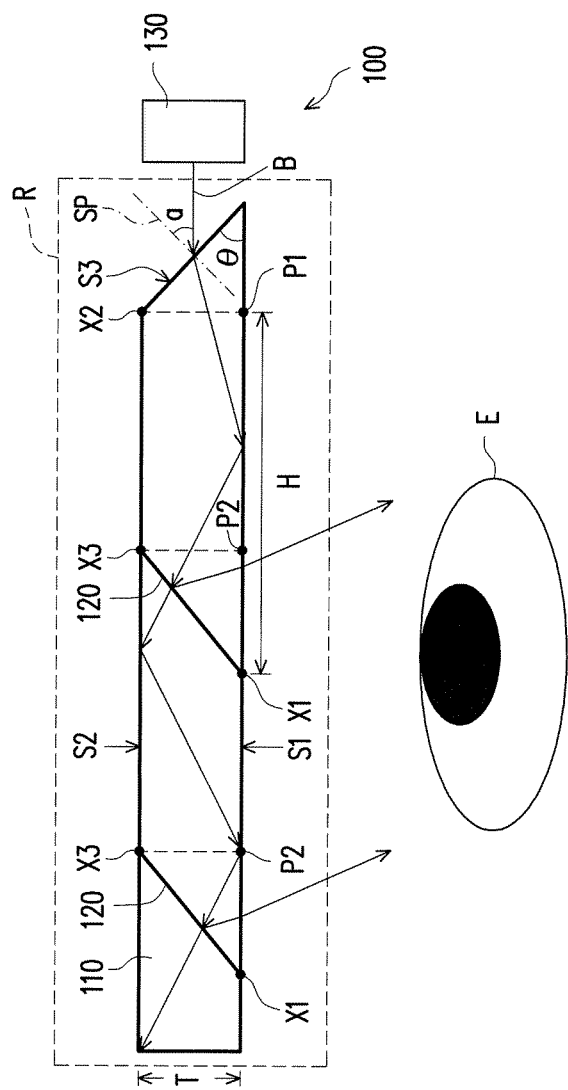
FIG. 2 is a schematic top-view diagram illustrating an optical module according to a first embodiment of the invention.

FIG. 2 is a schematic top-view diagram illustrating an optical module according to a first embodiment of the invention. Referring to FIG. 2, an optical module 100 includes an optical waveguide 110, at least one beam splitter 120 and a light source 130. FIG. 2 schematically illustrates two beam splitters 120, but the number of the beam splitters 120 is not limited thereto.

The optical waveguide 110 has a first surface S1, a second surface S2 and a light incidence surface S3. The first surface S1 and the second surface S2 are parallel to each other. The light incidence surface S3 is connected with the first surface S1 and the second surface S2. The light may transmit through the light incidence surface S3. The light incidence surface S3 is inclined relative to the first surface S1 and the second surface S2. An interior angle included between the light incidence surface S3 and the first surface S1 is θ, and the interior angle θ is greater than 0° and smaller than 90°.

The at least one beam splitter 120 (which is schematically illustrated as two sheets in FIG. 2, but the invention is not limited thereto) is disposed in the optical waveguide 110, and each beam splitter 120 is connected with the first surface S1 and the second surface S2. Each beam splitter 120 and the first surface S1 have a first intersection point X1 on a reference plane R perpendicular to the first surface S1, and the light incidence surface S3 and the second surface S2 have a second intersection point X2 on the reference plane R. The second intersection point X2 has a first orthogonal projection P1 (point) on the first surface S1. A distance between the first orthogonal projection P1 and the first intersection point X1 closest to the light incidence surface S3 is H.

In the embodiment, each beam splitter 120 and the second surface S2 have a third intersection point X3 on the reference plane R. The third intersection point X3 has a second orthogonal projection P2 on the first surface S1. Each second orthogonal projection P2 is located between the corresponding first intersection point X1 and the first orthogonal projection P1, but the invention is not limited thereto.

The light source 130 is disposed next to the light incidence surface S3 and adapted to provide a beam B. For example, when the optical module 100 is applied in a head mounted display, the light source 130 may be an image light source, and the beam B may be an image beam. The image light source may be a digital micro-mirror device (DMD), a liquid crystal display (LCD), a liquid crystal on silicon (LCOS) microdisplay or other types of microdisplay.

The beam B enters the optical waveguide 110 through the light incidence surface S3. Since the light incidence surface S3 is inclined relative to the first surface S1 and the second surface S2, the beam B after entering the optical waveguide 110 through the light incidence surface S3 is transmitted toward the beam splitter 120 and is partially reflected by the beam splitter 120, such that the beam B emits out of the optical waveguide 110 through the first surface S1 and is transmitted to a user's eyes E. Since no reflector used for guiding the beam B to the beam splitter 120 has to be disposed in the optical waveguide 110 of the optical module 100, a travelling path change due to the beam B irradiated to an end portion of the reflector can be avoided, so as to contribute to reducing the stray light generated inside the optical waveguide 110.

An incidence angle of the beam B at the light incidence surface S3 is a. In order to ensure the beam B to enter the optical waveguide 110 through the light incidence surface S3 successfully, the incidence angle conforms a condition, a≥0. In the embodiment, the condition that a>0 refers to the beam B being incident into the light incidence surface S3 through a side of a normal plane SP of the light incidence surface S3 which is near the first surface S1, and the condition that a=0 refers to the beam B being perpendicularly incident into the light incidence surface S3 along the normal plane SP. Moreover, in order to ensure the beam B after entering the optical waveguide 110 may be transmitted to the beam splitter 120 through total reflection, the interior angle θ included between the light incidence surface S3 and the first surface S1 has to conform to $$\sin^{-1}\left(\frac{1}{n}\right) < \theta < 90°,$$

wherein n is a refractive index of the optical waveguide 110. In the embodiment, a material adaptive to the optical waveguide 110 conforms to 1.4≤n≤1.9, but the invention is not limited thereto. Additionally, in order to prevent the stray light from being generated due to the beam B incident into the light incidence surface S3 being directly irradiated to a first beam splitter (which is the beam splitter 120 closest to the light incidence surface S3) without any total reflection, $$a \leq \sin^{-1}\left\{n \times \sin^{-1}\left[90° - \theta - \tan^{-1}\left(\frac{H}{T}\right)\right]\right\}$$

has to be satisfied, wherein T is a distance between the first surface S1 and the second surface S2, so as to ensure that the beam B entering the optical waveguide 110 is transmitted to the first beam splitter through at least one total reflection. Thereby, the optical module 100 can effectively contribute to reducing a ratio of the stray light generated inside the optical waveguide 110.

Figure 3:
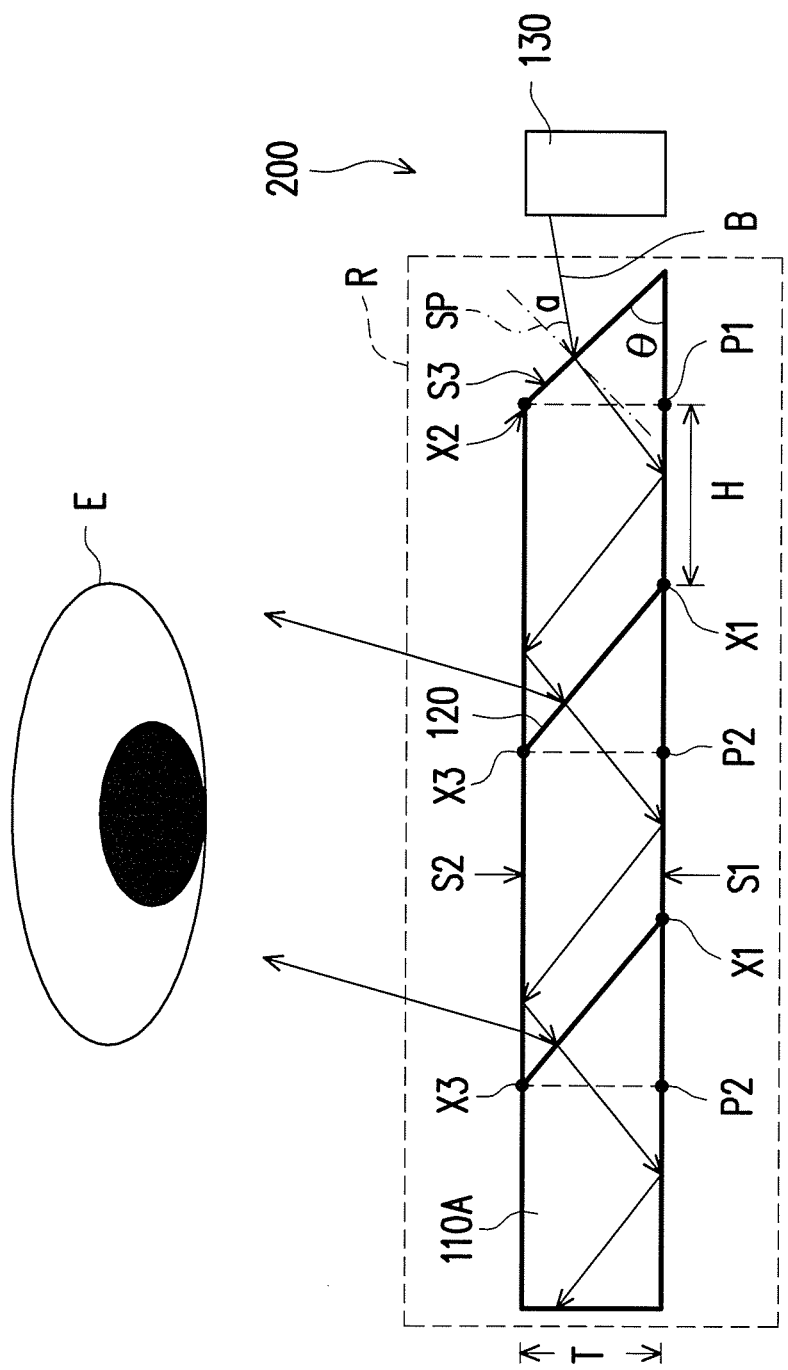
FIG. 3 is a schematic top-view diagram illustrating an optical module according to a second embodiment of the invention.

FIG. 3 is a schematic top-view diagram illustrating an optical module according to a second embodiment of the invention. Referring to FIG. 3, an optical module 200 of the embodiment is similar to the optical module 100 illustrated in FIG. 2, where the same or similar elements are represented by the same or similar reference numbers and will not be repeatedly described. The difference between the optical module 200 and the optical module 100 mainly lies in each first intersection point X1 being located between the corresponding second orthogonal projection P2 and the first orthogonal projection P1, and the beam B emits out of the optical waveguide 110A through the second surface S2.

Figure 4:
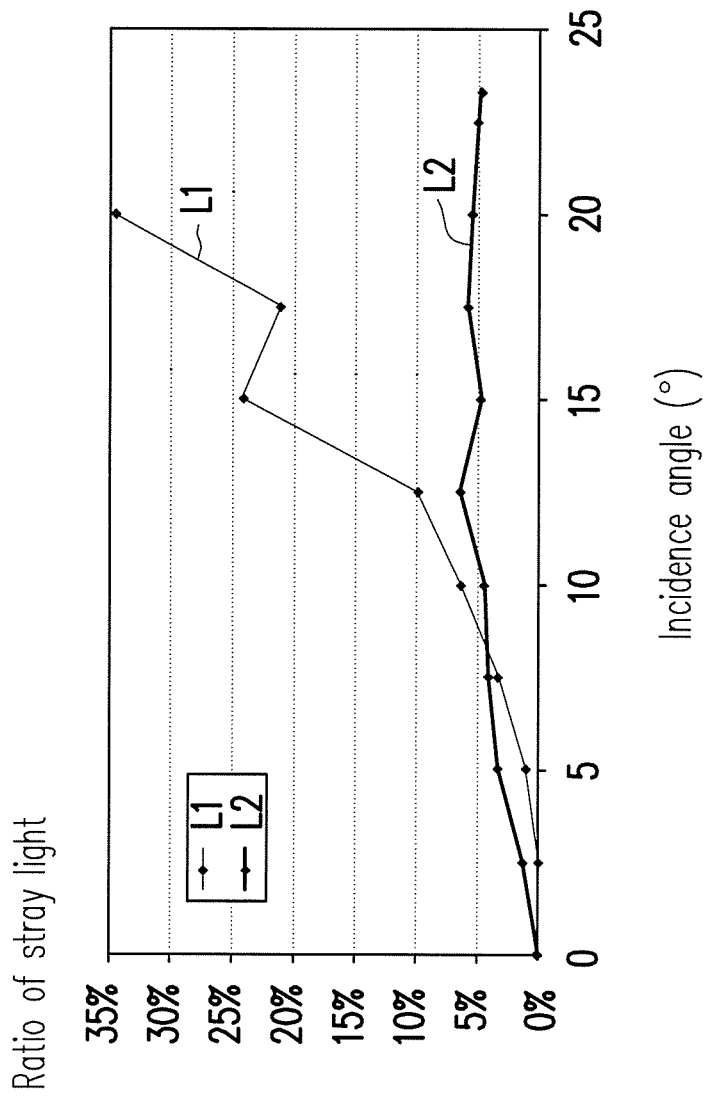
FIG. 4 illustrates ratios of the stray light simulated according to different incidence angles for the optical module of the invention and the optical module of a comparative example.

FIG. 4 illustrates ratios of the stray light simulated according to different incidence angles for the optical module of the invention and the optical module of related art. In the optical module of the related art, the beam is guided to the beam splitter by the reflector. A thin solid line L1 represents a ratio of the stray light simulated according to different incidence angles for the optical module of the related art. As the incidence angle is increased, the ratio of the stray light in the optical module of the related art tends to gradually rise up. A thick solid line L2 represents a ratio of the stray light simulated according to different incidence angles for the optical module of the embodiment. Comparatively, the ratio of the stray light of the optical module of the embodiment may be effectively suppressed under 10%. In other words, in comparison with the optical module of the related art, the optical module of the embodiment can contribute to effectively reducing the ratio of the stray light generated inside the optical waveguide through the design of the light incidence surface being inclined relative to the first surface and the second surface and conforming to the equation of $$a \leq \sin^{-1}\left\{n \times \sin^{-1}\left[90° - \theta - \tan^{-1}\left(\frac{H}{T}\right)\right]\right\}.$$

Figure 5:
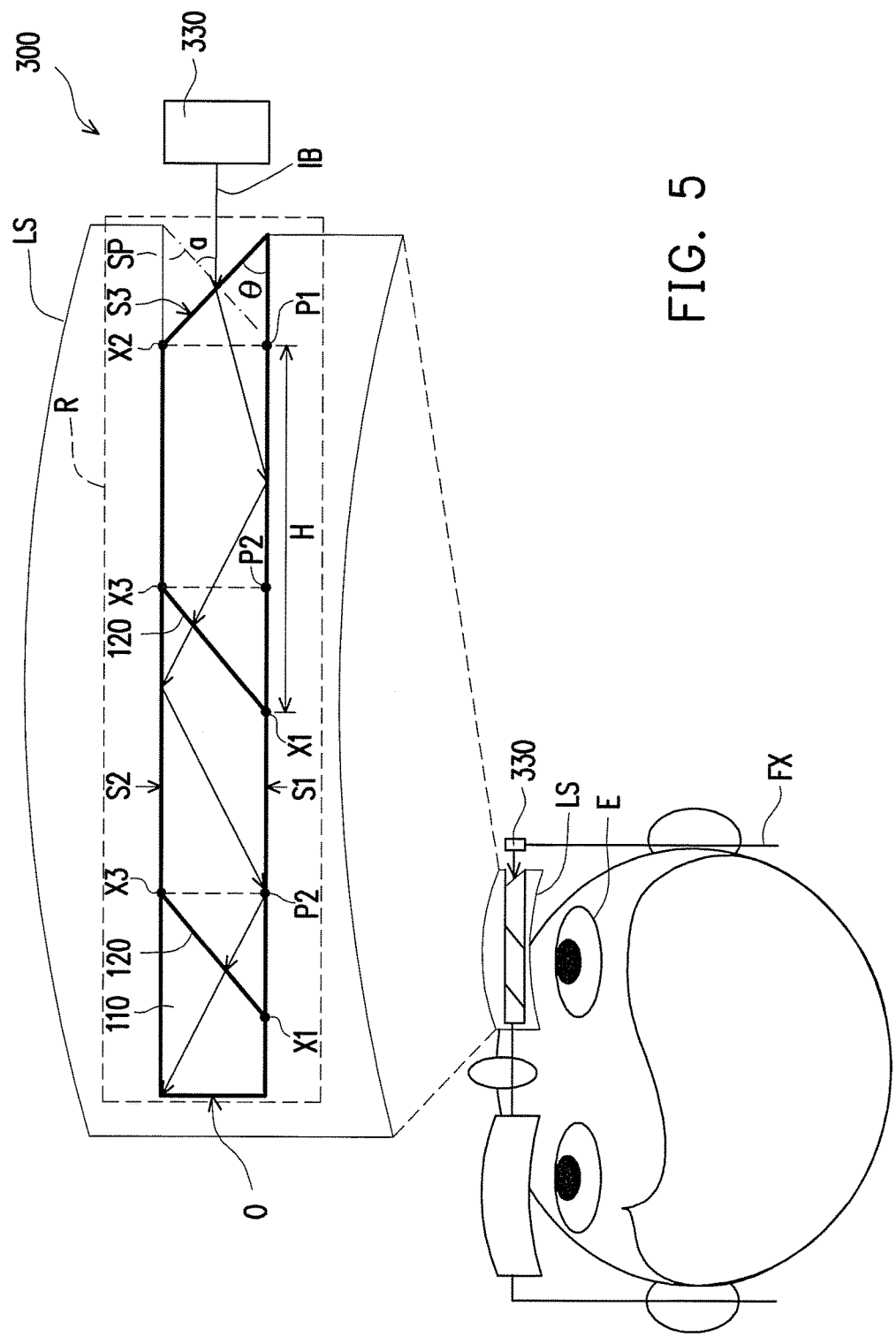
FIG. 5 is a schematic top-view diagram illustrating a head mounted display according to an embodiment of the invention.

FIG. 5 is a schematic top-view diagram illustrating a head mounted display according to an embodiment of the invention. Referring to FIG. 5, a head mounted display 300 of the embodiment is similar to the optical module 100 illustrated in FIG. 2, where the same or similar elements are represented by the same or similar reference numbers and may not be repeatedly described. The display device 330 may be, for example a projection optical system and adapted to provide an image beam IB.

In the head mounted display 300, the optical waveguide 110 has the light incidence surface S3 inclined relative to the first surface S1 and the second surface S2. The image beam IB after entering the optical waveguide 110 through the light incidence surface S3 is transmitted toward the beam splitter 120. Thus, no reflector used for guiding the image beam IB to the beam splitter 120 has to be disposed in the optical waveguide 110 of the head mounted display 300. With this design, a travelling path change due to the image beam IB being irradiated to an end portion of the reflector can be avoided, so as to contribute to reducing the stray light generated inside the optical waveguide 110. In addition, since the head mounted display 300 conforms to the design of $$a \leq \sin^{-1}\left\{n \times \sin^{-1}\left[90° - \theta - \tan^{-1}\left(\frac{H}{T}\right)\right]\right\}$$

(which may refer to the corresponding illustration of FIG. 2 for the description of each symbol), it can be ensured that the image beam IB entering the optical waveguide 110 is transmitted to the first beam splitter (which is the beam splitter 120 closest to the light incidence surface) through at least one total reflection, so as to avoid the stray light from being generated due to the image beam IB which is directly irradiated to the first beam splitter without any total reflection. Thus, the head mounted display 300 can have good display quality.

It should be noted that FIG. 5 merely schematically illustrates one configuration of the head mounted display 300, but the invention is not limited thereto. In other embodiments, the optical waveguide 110 of the head mounted display 300 may be replaced by the optical waveguide 110A illustrated in FIG. 3. In addition, the head mounted display 300 may further include other elements, such as a fixing member FX to fix the optical waveguide 110 and the display device 330 in front of the user's eyes E. The fixing member FX may be a pair of spectacles, which is not limited in the invention. The optical waveguide 110 may be fixed to an outer side of one of the lens LS of the fixing member FX or embedded in the lens LS. In a scenario where the optical waveguide 110 is embedded in the lens LS, the lens LS correspondingly forms an opening O containing the optical waveguide 110. The lens LS may be any types of lens, such as a prescription lens (i.e., a lens with diopters) or a sunglass lens (e.g., a green lens), and the lens LS may be made of glass, resin or any other adaptive material, which is not limited in the invention.

In light of the foregoing, the embodiments of the invention achieve at least one of the following advantages or effects. In the optical module and the head mounted display of the invention, the optical waveguide has the light incidence surface inclined relative to the first surface and the second surface. The beam or the image beam after entering the optical waveguide through the light incidence surface is transmitted toward the beam splitter. Thus, in the optical module and the head mounted display of the invention, it is unnecessary to dispose a reflector used for guiding the beam or the image beam to the beam splitter in the optical waveguide. With this design, the travelling path change due to the beam or the image beam being irradiated to an end portion of the reflector can be avoided, so as to contribute to reducing the stray light generated inside the optical waveguide. In addition, through the design of $$a \leq \sin^{-1}\left\{n \times \sin^{-1}\left[90° - \theta - \tan^{-1}\left(\frac{H}{T}\right)\right]\right\},$$

it can be ensured that the beam or the image beam entering the optical waveguide is transmitted to the first beam splitter (which is the beam splitter closest to the light incidence surface) through at least one total reflection, so as to avoid the stray light from being generated due to the beam or the image beam which is directly irradiated to the first beam splitter without any total reflection. Thus, the optical module can effectively reduce the ratio of the stray light generated inside the optical waveguide, and the head mounted display can have good display quality.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the invention as defined by the following claims. Moreover, no element and component in the disclosure is intended to be dedicated to the public regardless of whether the element or component is explicitly recited in the following claims.

What is claimed is:

1. An optical module, comprising:
   an optical waveguide, having a first surface, a second surface and a light incidence surface, the first surface and the second surface being parallel to each other, and the light incidence surface being connected with the first surface and the second surface, wherein an interior angle between the light incidence surface and the first surface is θ, a distance between the first surface and the second surface is T, and a refractive index of the optical waveguide is n;
   at least one beam splitter, disposed in the optical waveguide, and each of the at least one beam splitter being connected with the first surface and the second surface, wherein each of the at least one beam splitter and the first surface have a first intersection point on a reference plane perpendicular to the first surface, the light incidence surface and the second surface have a second intersection point on the reference plane, the second intersection point has a first orthogonal projection on the first surface, a distance between the first orthogonal projection and the first intersection point closest to the light incidence surface is H; and a light source, disposed next to the light incidence surface and adapted to provide a beam, wherein the beam enters the optical waveguide through the light incidence surface, and an incidence angle of the beam at the light incidence surface is a, which conforms to $$a \le \sin^{-1}\left\{n \times \sin^{-1}\left[90° - \theta - \tan^{-1}\left(\frac{H}{T}\right)\right]\right\}.$$

2. The optical module according to claim 1, wherein the interior angle θ between the light incidence surface and the first surface conforms to $$\sin^{-1}\left(\frac{1}{n}\right) < \theta < 90°.$$

3. The optical module according to claim 1, wherein the beam is incident into the light incidence surface through a side of a normal plane of the light incidence surface which is near the first surface.

4. The optical module according to claim 1, wherein each of the at least one beam splitter and the second surface have a third intersection point on the reference plane, the third intersection point has a second orthogonal projection on the first surface, each second orthogonal projection is located between the corresponding first intersection point and the first orthogonal projection, and the beam emits out of the optical waveguide through the first surface.

5. The optical module according to claim 1, wherein each of the at least one beam splitter and the second surface have a third intersection point on the reference plane, the third intersection point has a second orthogonal projection on the first surface, each first intersection point is located between the corresponding second orthogonal projection and the first orthogonal projection, and the beam emits out of the optical waveguide through the second surface.

6. A head mounted display, comprising:
an optical waveguide, having a first surface, a second surface and a light incidence surface, the first surface and the second surface being parallel to each other, and the light incidence surface being connected with the first surface and the second surface, wherein an interior angle between the light incidence surface and the first surface is θ, a distance between the first surface and the second surface is T, and a refractive index of the optical waveguide is n;
at least one beam splitter, disposed in the optical waveguide, and each of the at least one beam splitter being connected with the first surface and the second surface, wherein each of the at least one beam splitter and the first surface have a first intersection point on a reference plane perpendicular to the first surface, the light incidence surface and the second surface have a second intersection point on the reference plane, the second intersection point has a first orthogonal projection on the first surface, and a distance between the first orthogonal projection and the first intersection point closest to the light incidence surface is H; and a display device, disposed next to the light incidence surface and adapted to provide an image beam, wherein the image beam enters the optical waveguide through the light incidence surface, an incidence angle of the beam at the light incidence surface is a, which conforms to $$a \le \sin^{-1}\left\{n \times \sin^{-1}\left[90° - \theta - \tan^{-1}\left(\frac{H}{T}\right)\right]\right\}.$$

7. The head mounted display according to claim 6, wherein the interior angle θ between the light incidence surface and the first surface conforms to $$\sin^{-1}\left(\frac{1}{n}\right) < \theta < 90°.$$

8. The head mounted display according to claim 6, wherein the image beam is incident into the light incidence surface through a side of a normal plane of the light incidence surface which is near the first surface.

9. The head mounted display according to claim 6, wherein each of the at least one beam splitter and the second surface have a third intersection point on the reference plane, the third intersection point has a second orthogonal projection on the first surface, each second orthogonal projection is located between the corresponding first intersection point and the first orthogonal projection, and the beam emits out of the optical waveguide through the first surface.

10. The head mounted display according to claim 6, wherein each of the at least one beam splitter and the second surface have a third intersection point on the reference plane, the third intersection point has a second orthogonal projection on the first surface, each first intersection point is located between the corresponding second orthogonal projection and the first orthogonal projection, and the beam emits out of the optical waveguide through the second surface.

* * * * *